(12) United States Patent
Jones et al.

(10) Patent No.: US 8,875,620 B2
(45) Date of Patent: *Nov. 4, 2014

(54) AUTOMATED RACK/BASKET LIFTING SYSTEM FOR DEEP OPEN VAT FRYING SYSTEM

(75) Inventors: Douglas S. Jones, New Port Richey, FL (US); Henry Preston Hutson, Jr., Bossier City, LA (US)

(73) Assignee: Frymaster L.L.C., Shreveport, LA (US)

( * ) Notice: Subject to any disclaimer, the term of this patent is extended or adjusted under 35 U.S.C. 154(b) by 523 days.

This patent is subject to a terminal disclaimer.

(21) Appl. No.: 12/837,317

(22) Filed: Jul. 15, 2010

(65) Prior Publication Data

US 2011/0011278 A1    Jan. 20, 2011

Related U.S. Application Data

(60) Provisional application No. 61/270,947, filed on Jul. 15, 2009.

(51) Int. Cl.
A47J 37/12    (2006.01)

(52) U.S. Cl.
CPC ................................. A47J 37/1219 (2013.01)
USPC .................. 99/406; 99/404; 99/405; 99/331; 99/339; 99/340; 99/352

(58) Field of Classification Search
CPC .............................. A47J 37/1219; A47J 37/12
USPC .................. 99/404–406, 331, 339, 340, 352; 426/231

See application file for complete search history.

(56) References Cited

U.S. PATENT DOCUMENTS

| 1,977,454 A |   | 10/1934 | Price ................................ 161/16 |
| 2,040,016 A | * | 5/1936  | Sanders ........................... 475/11 |
| 2,177,166 A | * | 10/1939 | Bemis .............................. 34/562 |
| 2,215,929 A | * | 9/1940  | Husk ............................ 99/329 R |
| 3,026,790 A | * | 3/1962  | Arvan ............................. 99/336 |
| 3,061,279 A | * | 10/1962 | Reed ............................. 222/413 |
| 3,187,664 A | * | 6/1965  | Jennings ..................... 99/329 R |
| 3,273,488 A | * | 9/1966  | Anetsberger .................... 99/407 |
| 3,430,553 A | * | 3/1969  | Di Pietro ........................ 99/336 |

(Continued)

FOREIGN PATENT DOCUMENTS

GB    2 093 347 A    9/1982

OTHER PUBLICATIONS

International Search Report dated Sep. 2, 2010 from corresponding PCT/US2010/042164.

(Continued)

*Primary Examiner* — Dana Ross
*Assistant Examiner* — Brett Spurlock
(74) *Attorney, Agent, or Firm* — Ohlandt, Greeley, Ruggiero & Perle, L.L.P.

(57) ABSTRACT

A racking system for a deep fryer, wherein the deep fryer contains cooking oil, the racking system includes a housing; at least one rack that carries a food product; an actuator operatively associated with the rack to raise and lower the rack within the housing. The system further includes a sensor that detects a property of the cooking oil; and a controller that receives a signal to initiate a cooking cycle based on the property and sends a signal to permit activation of the actuator to raise and lower the rack.

18 Claims, 12 Drawing Sheets

(56) References Cited

U.S. PATENT DOCUMENTS

| | | | | |
|---|---|---|---|---|
| 3,466,997 A * | 9/1969 | Hartzog | ............................ | 99/330 |
| 3,501,316 A * | 3/1970 | Guthrie, Sr. | .................. | 426/296 |
| 3,563,158 A | 2/1971 | Omer | ................................ | 99/326 |
| 3,608,472 A * | 9/1971 | Pelster et al. | .................... | 99/327 |
| 3,635,722 A * | 1/1972 | Moore | ............................ | 426/438 |
| 3,690,246 A * | 9/1972 | Guthrie, Sr. | .................... | 99/336 |
| 3,821,925 A * | 7/1974 | Moore | ............................ | 99/327 |
| 3,894,483 A * | 7/1975 | Anetsberger et al. | ............ | 99/331 |
| 3,958,503 A * | 5/1976 | Moore | ............................ | 99/327 |
| 3,977,390 A * | 8/1976 | Fogel et al. | ................. | 126/374.1 |
| 4,560,074 A * | 12/1985 | Manning | ....................... | 212/179 |
| 4,593,170 A * | 6/1986 | Maeda et al. | .................. | 219/685 |
| 4,650,970 A * | 3/1987 | Ohouchi | ........................ | 219/506 |
| 4,732,081 A * | 3/1988 | Sakuma | ............................. | 99/407 |
| 4,785,725 A * | 11/1988 | Tate et al. | ........................ | 99/330 |
| 4,814,570 A * | 3/1989 | Takizaki | ........................ | 219/705 |
| 4,852,471 A * | 8/1989 | Lansing | ............................ | 99/330 |
| 4,898,091 A * | 2/1990 | Rozak et al. | .................... | 99/336 |
| 4,930,408 A * | 6/1990 | King et al. | ....................... | 99/407 |
| 4,951,558 A | 8/1990 | Figliuzzi | .......................... | 99/336 |
| 4,997,101 A * | 3/1991 | King et al. | ..................... | 220/318 |
| 5,019,412 A * | 5/1991 | Hattori | .......................... | 426/242 |
| 5,073,391 A * | 12/1991 | DeMars et al. | ................ | 426/231 |
| 5,097,752 A * | 3/1992 | Kung | ................................ | 99/336 |
| 5,142,968 A * | 9/1992 | Caron et al. | .................... | 99/404 |
| 5,165,329 A | 11/1992 | Jacob et al. | ....................... | 99/336 |
| 5,186,097 A * | 2/1993 | Vaseloff et al. | ................. | 99/330 |
| 5,195,569 A * | 3/1993 | Peterson et al. | ........... | 160/84.06 |
| 5,263,406 A * | 11/1993 | Chiu | .................................. | 99/407 |
| 5,379,684 A | 1/1995 | Ettridge | ........................... | 99/336 |
| 5,398,597 A | 3/1995 | Jones et al. | ...................... | 99/330 |
| 5,402,712 A | 4/1995 | King et al. | ........................ | 99/407 |
| 5,469,778 A * | 11/1995 | Prudhomme | ................... | 99/336 |
| 5,483,872 A * | 1/1996 | Nield | ............................... | 99/568 |
| 5,486,685 A * | 1/1996 | Dodds | ............................ | 219/720 |
| 5,524,527 A * | 6/1996 | Dumoux et al. | ................. | 99/333 |
| 5,528,982 A * | 6/1996 | Chuang | ........................... | 99/446 |
| 5,771,781 A * | 6/1998 | Sham | .............................. | 99/336 |
| 5,782,170 A * | 7/1998 | Pomara, Jr. | ..................... | 99/407 |
| 5,809,870 A | 9/1998 | Baillieul | ........................ | 99/330 |
| 5,881,632 A * | 3/1999 | Fadoul | ............................ | 99/326 |
| 5,974,955 A * | 11/1999 | King et al. | ...................... | 99/407 |
| 6,009,795 A | 1/2000 | Werts | .............................. | 99/336 |
| 6,022,572 A | 2/2000 | Winter et al. | .................. | 426/231 |
| 6,085,640 A | 7/2000 | King | ................................. | 99/407 |
| 6,112,646 A | 9/2000 | King et al. | ...................... | 99/336 |
| 6,168,665 B1 * | 1/2001 | Sakai et al. | .................... | 118/500 |
| 6,274,847 B1 | 8/2001 | Hlava et al. | ................... | 219/433 |
| 6,305,270 B1 | 10/2001 | Wang | .............................. | 99/336 |
| 6,322,831 B1 | 11/2001 | Mote et al. | ..................... | 426/231 |
| 6,336,395 B1 | 1/2002 | Tiszai | ............................. | 99/407 |
| 6,588,325 B1 | 7/2003 | Savage | ............................ | 99/407 |
| 6,626,088 B2 * | 9/2003 | Ono | ................................. | 99/330 |
| 7,105,780 B2 | 9/2006 | De'Longhi | ..................... | 219/436 |
| 7,299,745 B2 * | 11/2007 | Nelson et al. | ................. | 100/110 |
| 7,484,455 B2 | 2/2009 | De'Longhi | ...................... | 99/330 |
| 8,522,671 B2 * | 9/2013 | Jones et al. | ..................... | 99/330 |
| 2005/0241492 A1 * | 11/2005 | Kooyker et al. | ................. | 99/403 |
| 2007/0028781 A1 | 2/2007 | Popeil et al. | | |
| 2009/0044706 A1 | 2/2009 | Foster et al. | | |

OTHER PUBLICATIONS

International Preliminary Report on Patentability mailed Apr. 1, 2011 in the related PCT/US2010/024759 ("Additional Citations").

Extended European Search Report dated Sep. 12, 2012 from corresponding EP Application No. 10744368.1, 6 pages.

* cited by examiner

AUTOMATED RACK/BASKET LIFTING SYSTEM FOR DEEP OPEN VAT FRYING SYSTEM

CROSS-REFERENCE TO RELATED APPLICATIONS

This application claims benefit of U.S. Provisional Patent Application No. 61/270,947 filed on Jul. 15, 2009, which is incorporated by reference herein.

BACKGROUND OF THE DISCLOSURE

1. Field of the Disclosure

This disclosure relates to a rack lifting system for deep fryers for the food service industry. More particularly, this disclosure relates to a basket and rack lifting system that lifts large food loads that travel into a deep frying vessel. Still more particularly, the rack lifting system is operatively connected to temperature and timing controls to control the lowering and lifting of the rack from the vat.

2. Description of Related Art

A commercial deep fat fryer typically has a vat which holds melted shortening or oil in a heated surface of either tank walls or tubes extending through the lower portion of the tank which heat the oil to the cooking temperature. Alternatively, such a vat has walls that are heated. When the oil is at a proper temperature an operator must lower a large quantity of food into the tank until it is cooked and then retrieve it. Foods typically cooked in a commercial situation with a deep fat fryer include battered coated chicken, fish and non-battered coated items such a French fries. In a commercial situation it is desirable to cook large quantities of such foods, but the problem of lowering the food into the tank, and retrieving the cooked food from the tank should require only a minimum involvement of an operator. Most importantly, substantial operator exertion and cooking discretion should not be required for customer and operator safety, particularly when the loads are large and the fryers are deep.

Currently, rack lifting systems for frying in deep fryers that are manually lifted and controlled are commercially available. Such systems use different motors and mechanical lifts to move fryer baskets or rack systems into cooking oil. Other systems use cables, guide rails and motorized pulley systems to raise and lower the food for cooking.

With all such systems, reliability and safety are concerns. Automated basket and rack lifting systems must be able to lower the food to be cooked into the cooking oil at the proper cooking temperature. This is particularly true when the fryer handles large food product loads that must travel deep into the frying vessel. Food that is undercooked presents health concerns and food that is is overcooked is unsatisfactory for the consumer. Further, the large volume of cooking oil and the large amount of food to be cooked can present a safety concern for the operator.

Accordingly, there is a need for a basket and rack lifting system that is able to travel into a deep frying vessel that is operatively connected to a controller that monitors temperature and timing controls to automatically raise and lower the food product out of the cooking oil at a predetermined cooking cycle.

SUMMARY OF THE INVENTION

The present disclosure provides for a deep fryer that permits selection of a cooking cycle and lowers a plurality of racks into cooking oil after a proper oil temperature has been sensed for a particular food product.

The present disclosure also provides for a deep fryer having a rack lifting system and a controller that maintains the desired cooking depth of a plurality of racks in the cooking oil and holds the rack at such depth until the cooking cycle is completed and automatically enables lifting the rack from the oil after a preprogrammed length of time.

A racking system for a deep fryer, wherein the deep fryer contains cooking oil, the racking system includes a housing; at least one rack that carries a food product; an actuator operatively associated with the rack to raise and lower the rack within the housing. The system further includes a sensor that detects a property of the cooking oil; and a controller that receives a signal to initiate a cooking cycle based on the property and sends a signal to permit activation of the actuator to raise and lower the rack.

A racking system for a deep fryer, wherein the deep fryer contains cooking oil, the racking system includes a housing; a pair of tracks disposed on opposite sides of the housing for supporting at least one rack; and an actuator operatively associated rack; wherein the actuator raises and lowers rack within the housing. The system further includes a sensor disposed in the housing and that is submerged by cooking oil; wherein the sensor detects a temperature of the cooking oil; and a controller that stores information related to a cooking cycle for a plurality of different food products and receives a signal from the sensor to initiate a cooking cycle based upon the temperature when said temperature is within a pre-programmed range. The system further comprises at least one switch that is activated by the controller once the pre-program temperature is reached, wherein activation of the at least one switch permits the at least one rack to be lowered into the cooking oil.

The present disclosure further provides for a deep fryer having a controller that enables an actuator element to raise and lower racks holding a food product into cooking oil using rollers and tracks in the rack support system.

BRIEF DESCRIPTION OF THE DRAWINGS

The foregoing and still other objects and advantages of the present invention will be more apparent from the following detailed explanation of the preferred embodiments of the invention in connection with the accompanying drawings.

DETAILED DESCRIPTION OF THE DISCLOSURE

Figure 1:
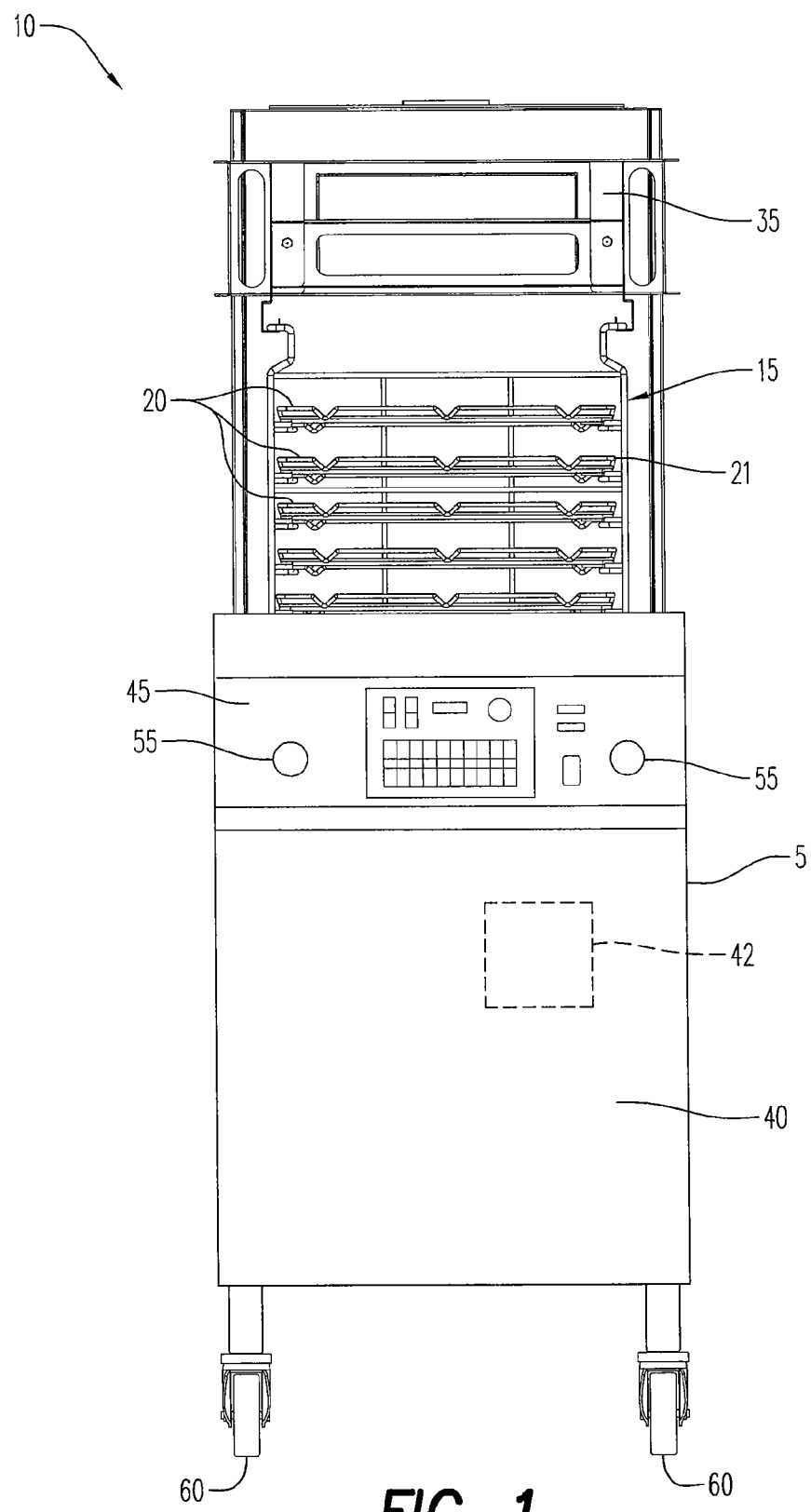
FIG. 1 illustrates a front view of the deep fryer incorporating a rack lifting system according to the present invention.
Figure 2:
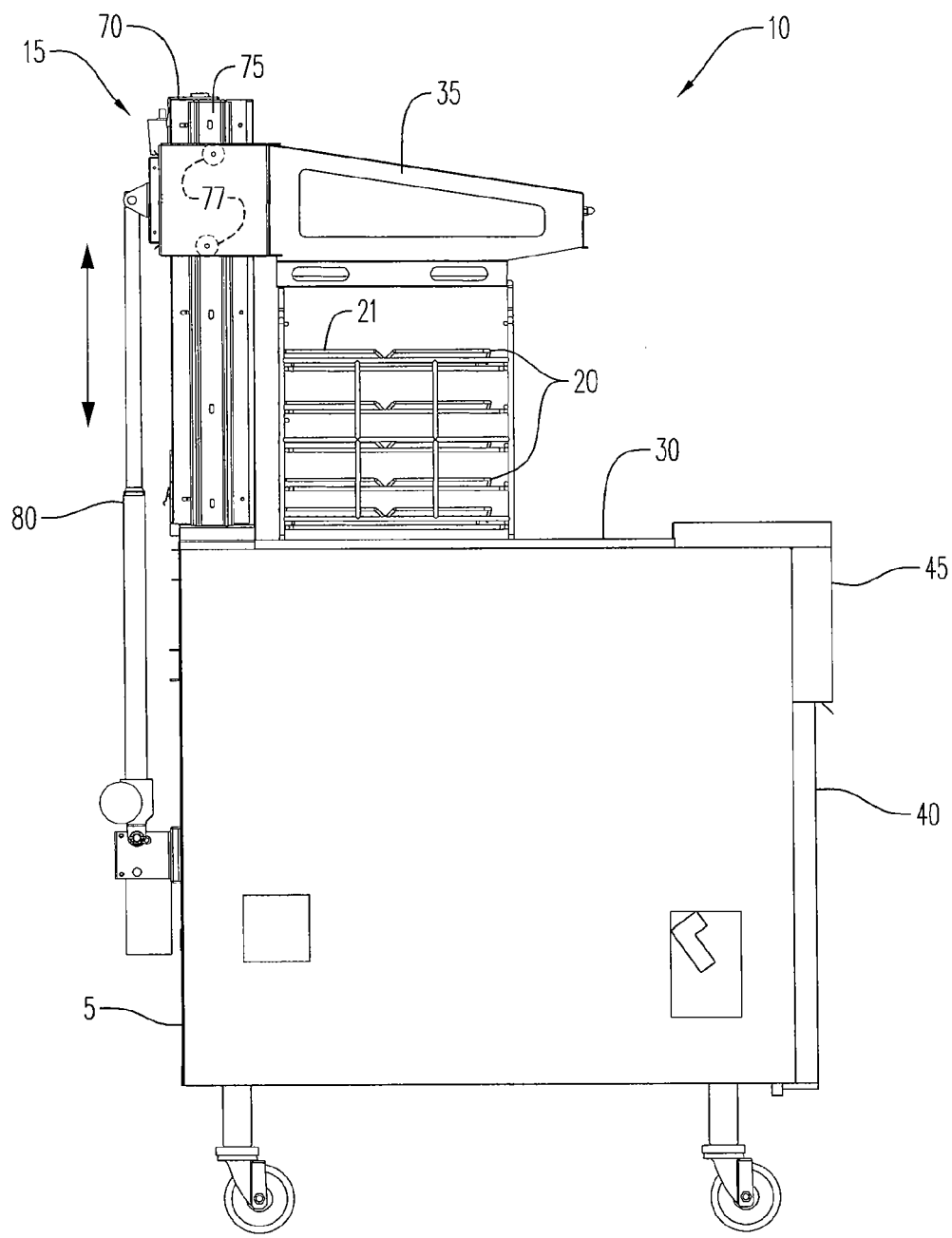
FIG. 2 illustrates a side view of the deep fryer according to FIG. 1 of the present invention.
Figure 3:
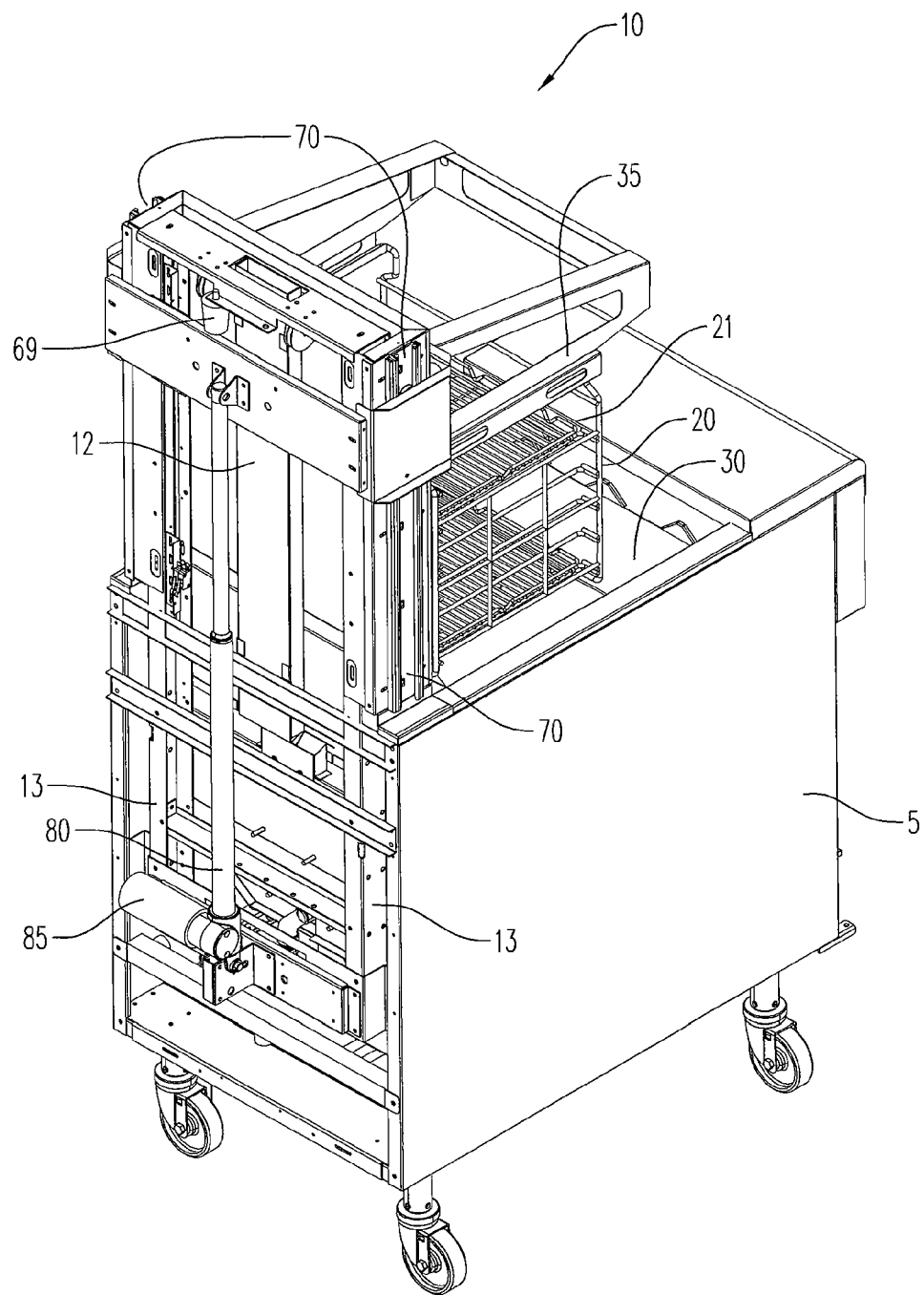
FIG. 3 illustrates a rear perspective view of the deep fryer according to FIG. 1.

FIG. 1 shows a deep fryer according to the present invention, generally referenced by reference numeral 10. Deep fryer 10 has a housing 5 and a rack lifting system 15 having a plurality of racks 20. Each rack 21 is capable of carrying a food product or multiple pieces of food product, such as for example, a chicken or chicken pieces, for cooking in oil vat 30 contained in housing 5. Referring to FIGS. 2 and 3, rack lifting system 15 has a track 70 to enable movement of plurality of racks 20 in a cantilevered fashion along track 70. Fryer 10 also has a flue rising 12, shown in FIG. 3, disposed adjacent to and behind vat 30. Flue riser 12 has structural support members 13 on opposite sides to limit excessive bending of flue 12 from a cantilevered load.

Each of the plurality of racks 21 may carry the weight of more than one chicken or chicken pieces, for example, so that at least six chickens may be cooked at a single time. Each rack 21 is supported by rack support 35. Plurality of racks 20 and rack support 35 are disposed over oil vat 30. Oil vat 30 is sized to accommodate cooking oil to cover all food products placed on the racks 20. Accordingly, racks 20 and rack support 35 are able to support a wide weight range of food product. Deep fryer 10 may be supported on casters 60 to enable an operator to easily move fryer 10 around kitchen.

Deep fryer 10 also has a front surface 40 having a control panel 45. Control panel 45 shows a pair of control switches 55 disposed on opposite sides of control panel 45; however, any configuration of control switches may be used to promote safe cooking practices. Rack lifting system 15 is controlled by a controller 42. Control panel 45 contains a data input surface or keypad for controller 42 to permit an operator to pre-program controller. Controller 42 has a data storage device for storing information such as food type, cooking temperatures and cooking times for cooking cycles. A user may select a cooking cycle for a particular food product. Cook cycle defines temperature and timing for cooking of food product. A temperature sensor 65 may be operatively associated with controller 42 to provide signals regarding the temperature of cooking oil in vat 30. Temperature sensor 65 may disposed in a region of oil vat that 30 that coincides with the position of plurality of racks 20 when they are submerged in cooking oil so that an accurate oil temperature is sensed by sensor 65. Once a pre-programmed temperature for the cooking oil is reached, the switch or switches 55 can be depressed and plurality of racks 20 are lowered.

Figure 4:
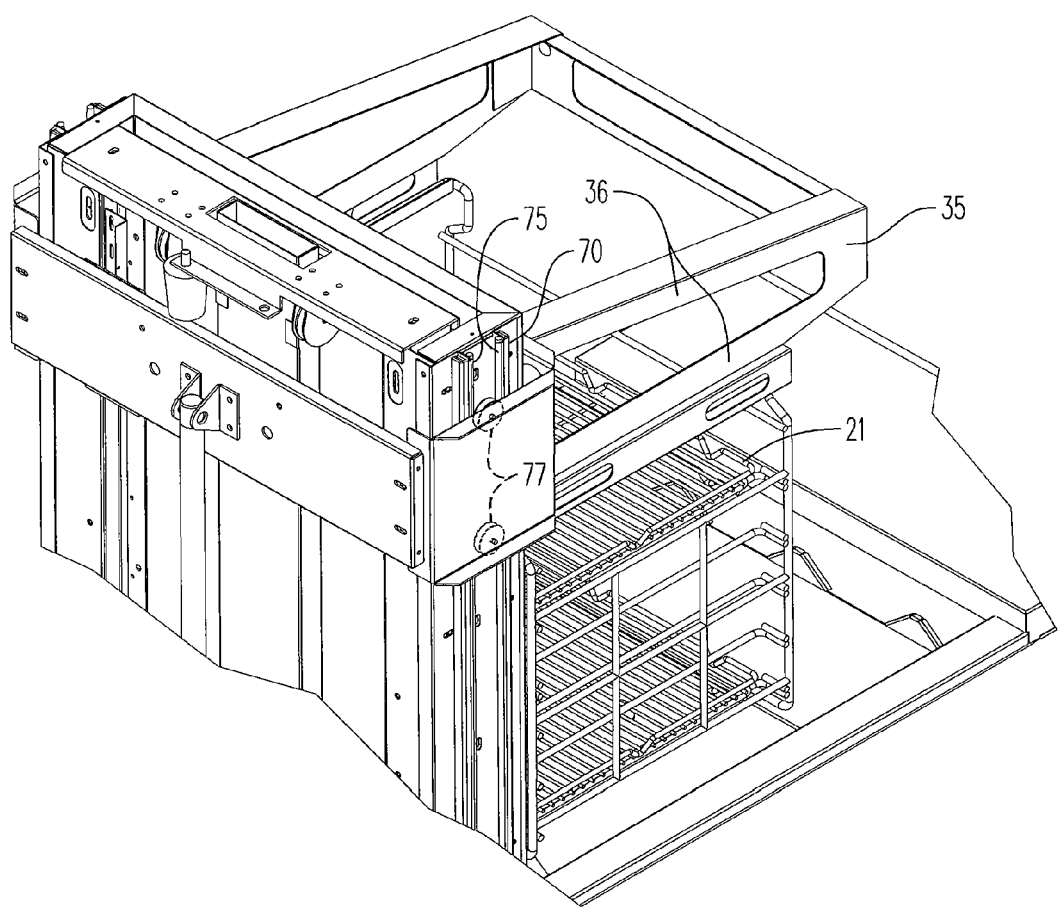
FIG. 4 illustrates a rear perspective view of the pulley system of the deep fryer according to FIG. 1.
Figure 8:
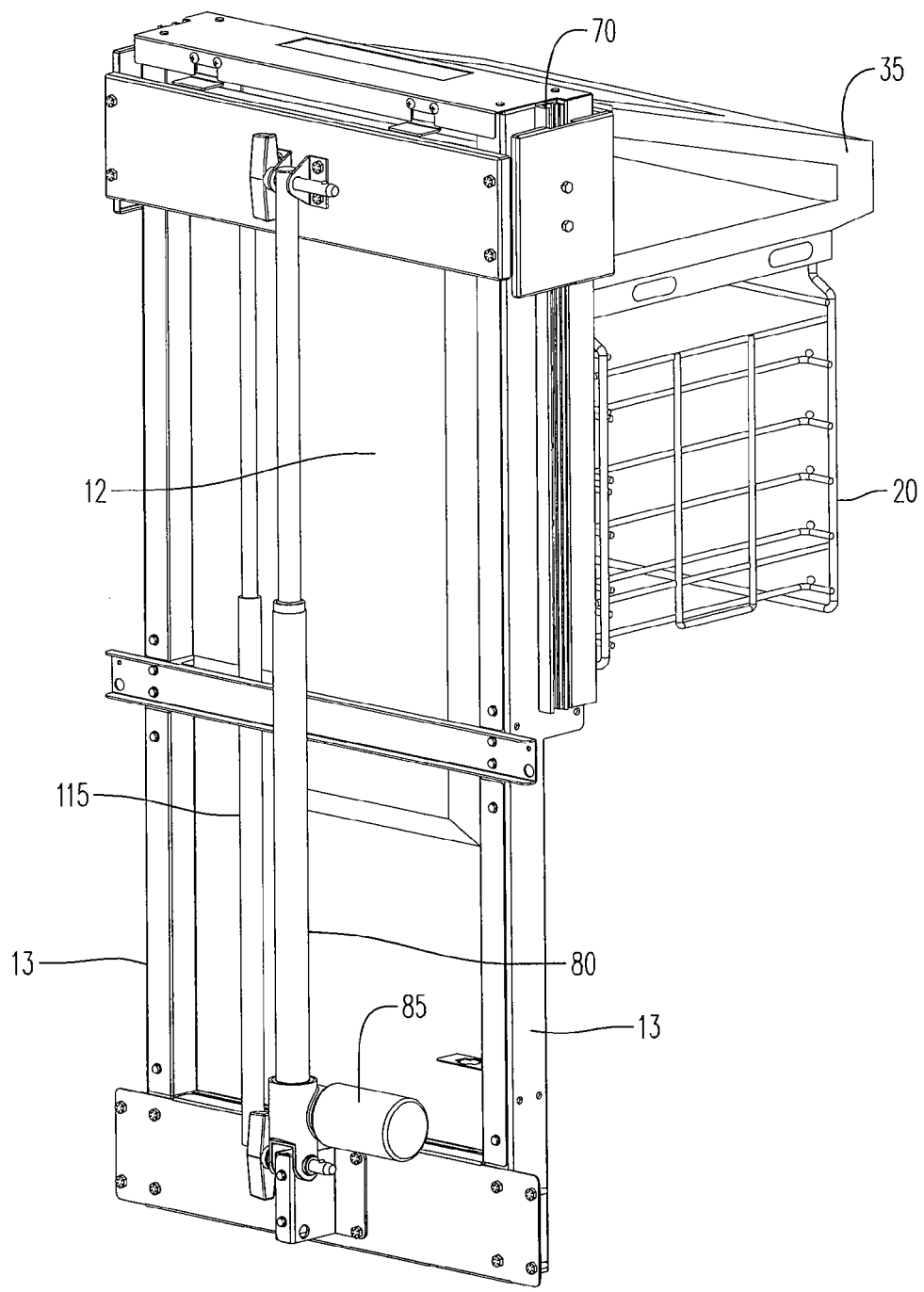
FIG. 8 illustrates a further embodiment of the lifting system of the deep fryer of FIG. 1 having a linear actuator and an optional air spring counter balance.
Figure 10:
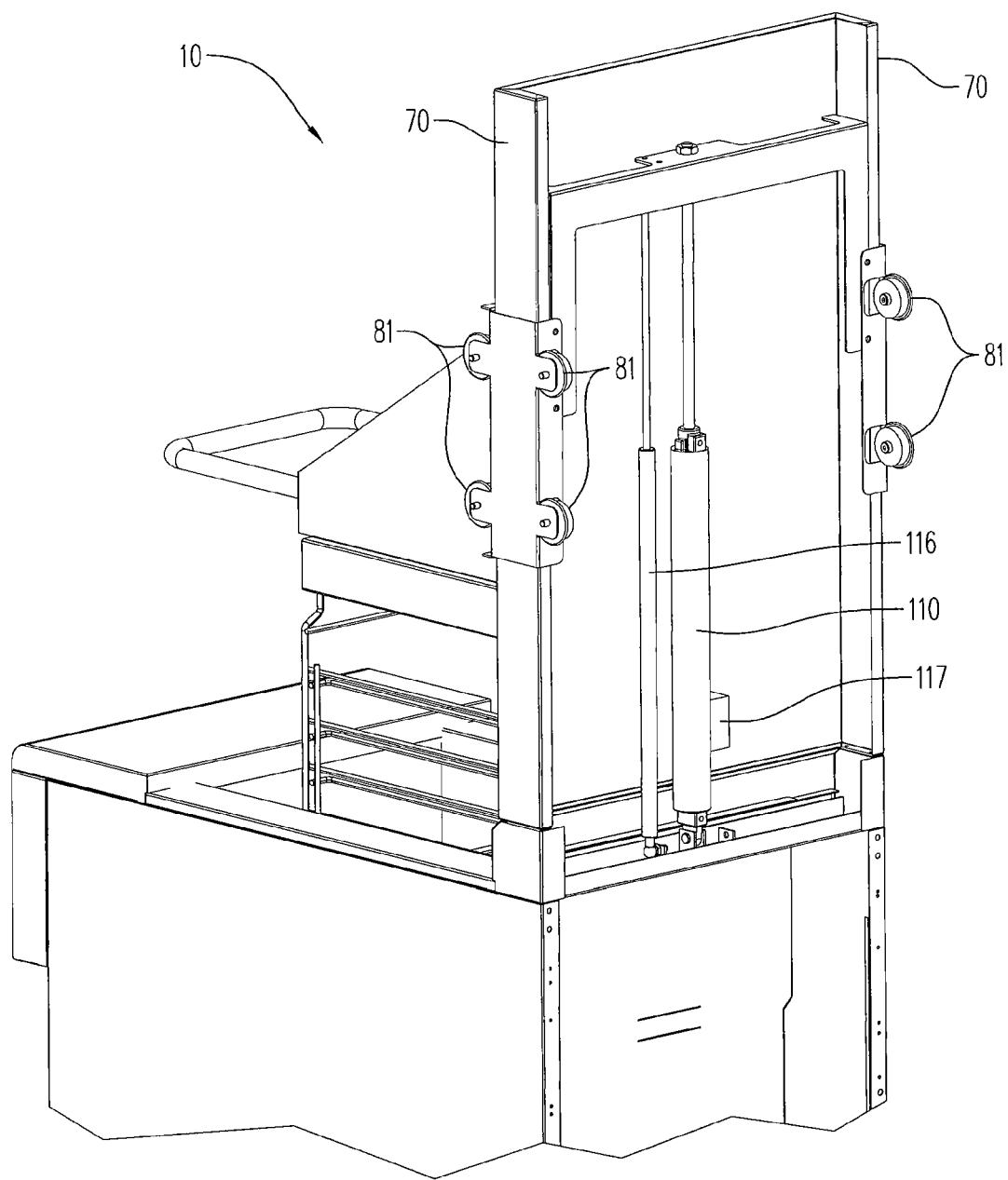
FIG. 10 illustrates a further embodiment of the lifting system having a hydraulic lift cylinder and an optional air spring counter balance.

Referring to FIGS. 2 through 4, deep fryer 10 is shown from a rear and perspective view. Deep fryer 10 shows rack support 35 that is supported on track 70. Track 70 is connected to top of housing 5 and is centrally disposed on deep fryer 10 for stability. Track 70 has a two track guides 75 that are each shaped to receive pair of rollers 77. Track guides 75 receive one of a pair of rollers 77 disposed in rack support 35. Opposite side of track (not shown) also has a track 70 that receives the other of the pair of rollers 77. A safety stop 69 is disposed at top of flue 12 to ensure that support rack 35 does not disengage from track 70 during manual lifting of rack support 35 should actuator 80 malfunction. In the event of actuator 80 malfunction, a counter balance system, such as that of FIG. 8 or FIG. 10, is activated to permit manual lifting of racks from cooking oil to uppermost position at stop 69.

Figure 5A:
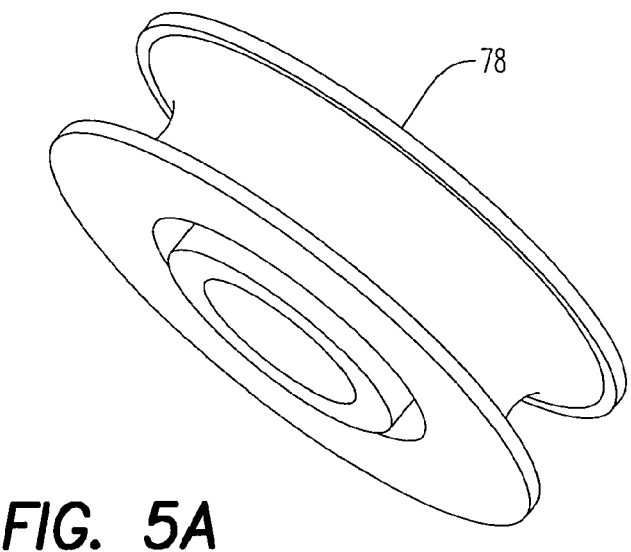
FIGS. 5a and 5b illustrate roller in a track according to a first embodiment of the lifting system of deep fryer of FIG. 1.
Figure 5B:
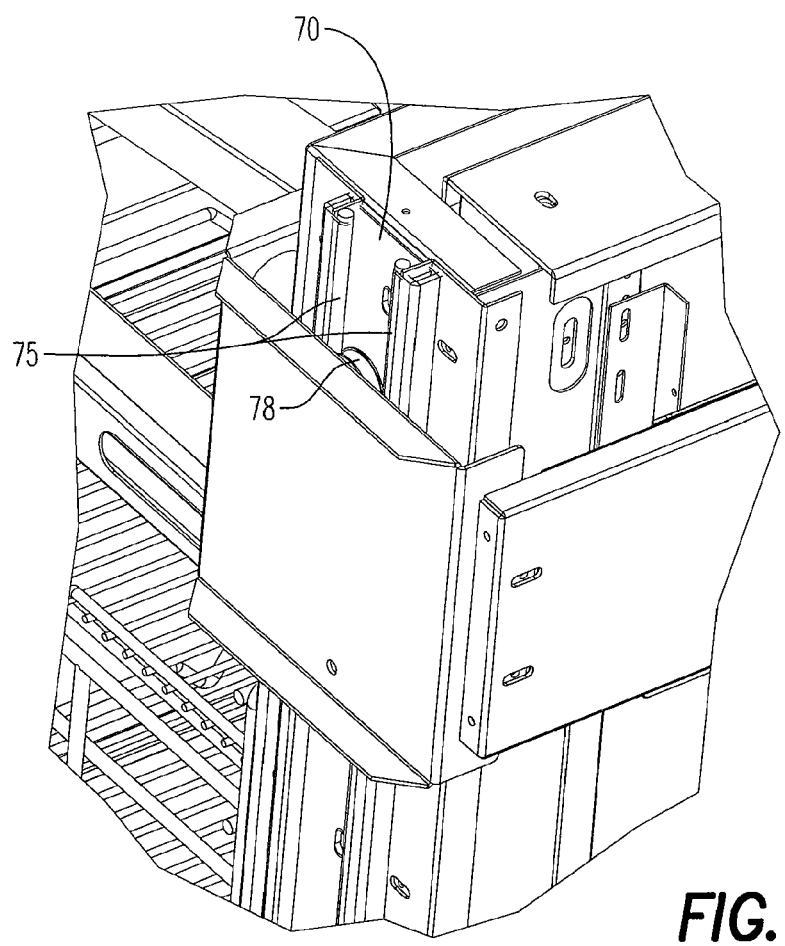

Referring to FIGS. 5a and 5b, one of the rollers 78 of pair of rollers 77 along track 70. Track 70 is a flat track that is able to accommodate roller 78. Roller 78 is a cupped roller that slides along track guides 75 for smooth movement during lifting and lowering of heavy loads handled by rack lifting system 15. Guide racks 75 are round rods having a circular cross-section to permit smooth movement of rollers 78. Further, rear guide track 36, furthest away from rack 35 is movable in slots 36 to adjust lift carriage parallelism with the edge of fryer 10, as shown in FIG. 4.

Figure 6A:
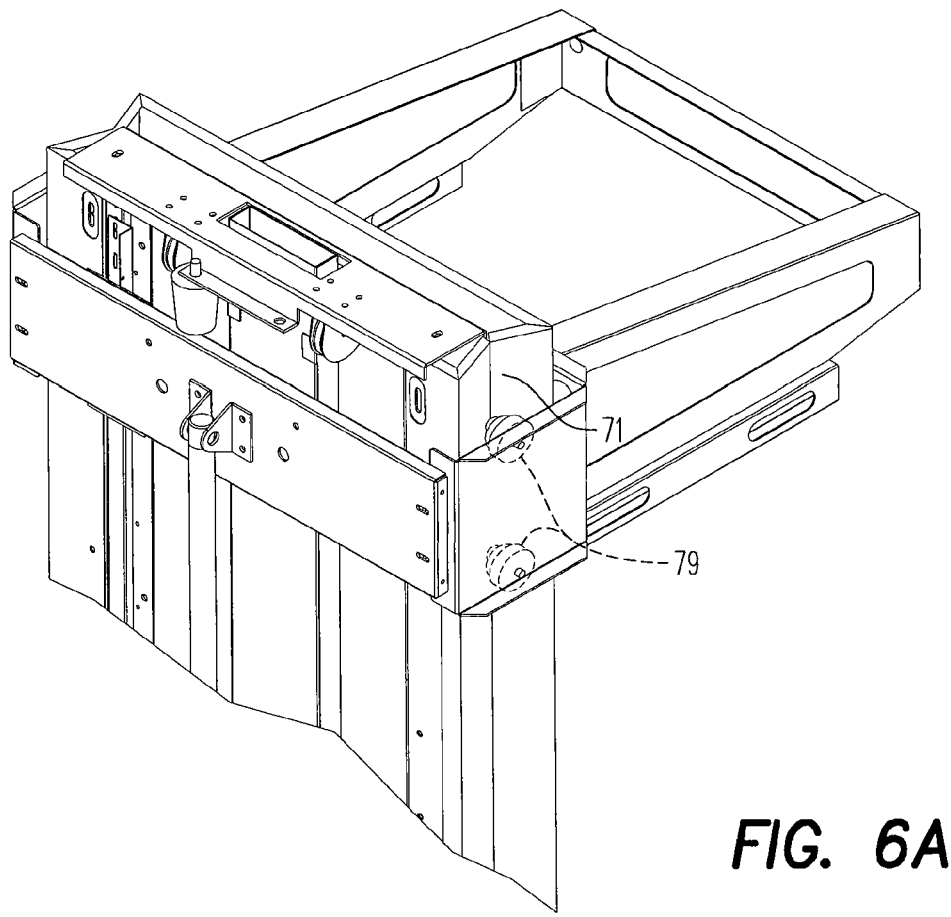
FIGS. 6a and 6b illustrate rollers and a track according to a second embodiment of the lifting system of deep fryer of FIG. 1.
Figure 6B:
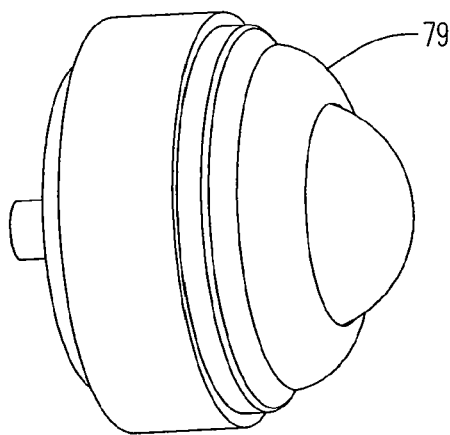

In an alternative embodiment shown in FIGS. 6a and 6b, track 71 has a v-shaped groove to align lifting system. Rollers 79 are shaped as planetary bearings to slide within v-shaped groove of track 70.

Figure 7:
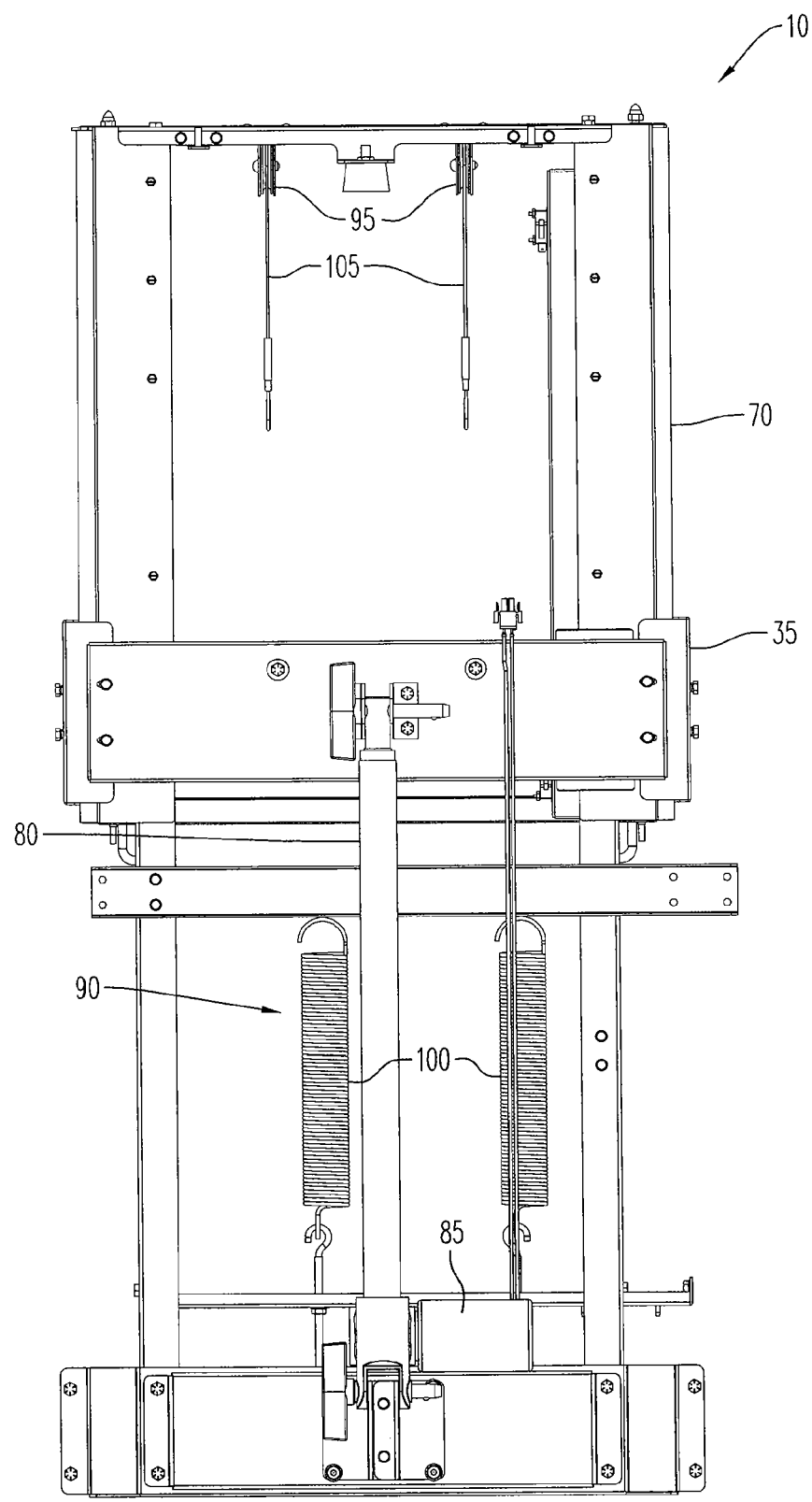
FIG. 7 illustrates a rear view of the deep fryer of FIG. 1 having a counter balance system.

In FIG. 7, rack support 35 is moved along track 70 in the vertical direction, to be raised and lowered in cooking oil, by linear actuator 80. Linear actuator 80 is operatively connected to motor 85, such that motor 85 provides motive force to raise and lower rack support 35 via actuator 80. Motor 85 is a reversible motor. Controller 42 sends signals to motor 85 to move rack support 35 at the beginning and ending of a cooking cycle, selected by user. Linear actuator 80 is designed with sufficient stroke force to lift and submerge load to the desired programmed positions during a cooking cycle. Motor 85 does not commence movement until required temperature of cooking oil is achieved for food product.

Also referring to FIGS. 4 and 7, deep fryer 10 has a counter balance system 90 to minimize the load on linear actuator 80 during lifting of carriage. Counter balance system 90 includes pulleys 95 counter balance springs 100 and a wire rope 105 connecting pulleys 95 and counter balance springs 100. Further, counter balance system 90 is also used if necessary to manually return rack support 35 to upper-most position in the event that actuator 80 fails to lift and properly operate.

FIG. 8 illustrates an alternative system having a linear actuator 80 with motor 85. Motor 85 provides motive force to raise and lower rack support 35 and plurality of racks 20. As an optional safety feature, counter balance gas springs 115 assist in the lifting of plurality of racks 20. Structural support members 13 accommodate the weight of food product, and prevent bending of flue 12 due to weight of food.

Figure 9:
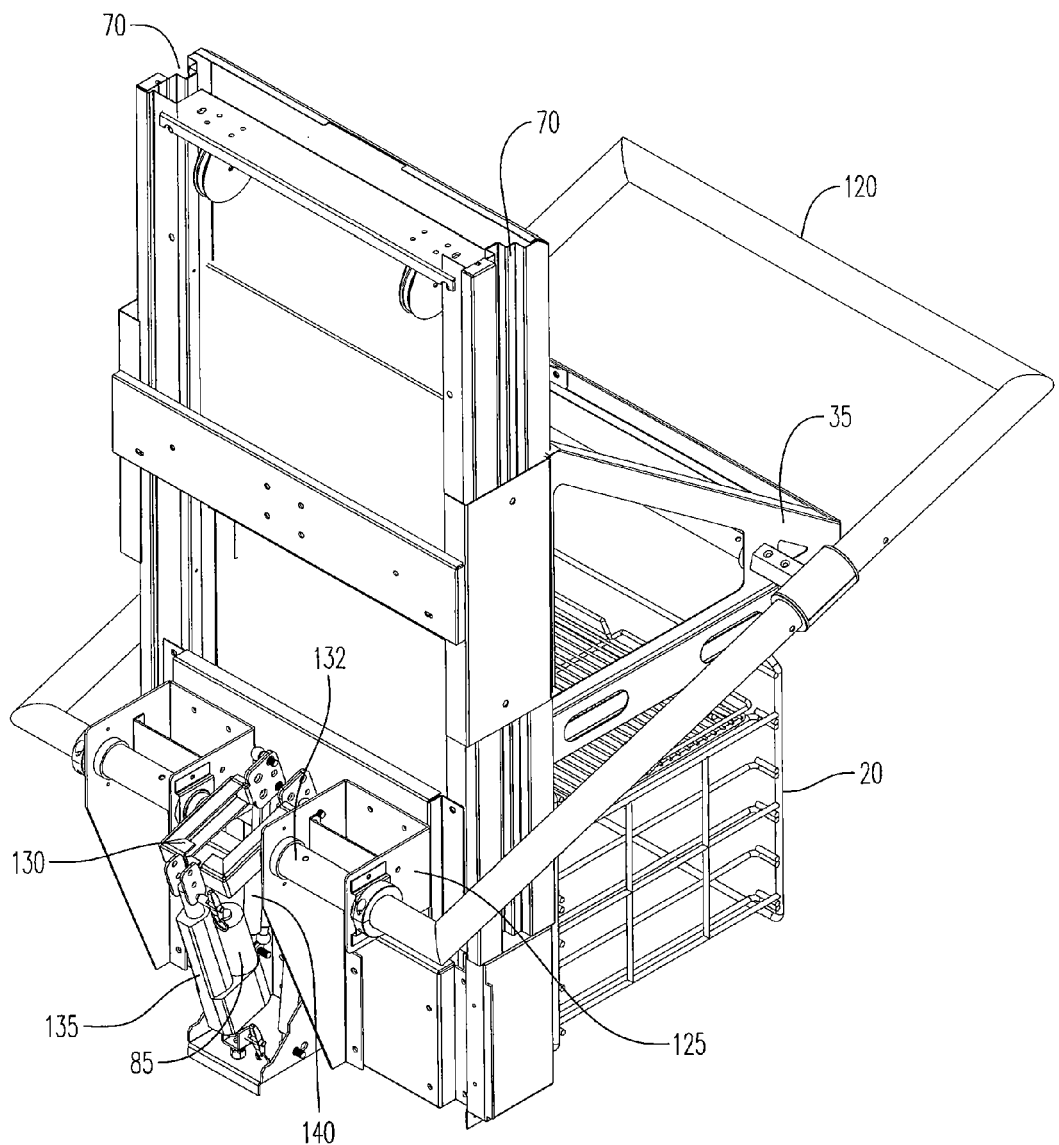
FIG. 9 illustrates a further embodiment of the lifting system with a pivoting arm lifting mechanism.

Referring to FIG. 9, a further embodiment of lift system 15 is shown. This embodiment includes an arm 120 that slides in rack support 35 during vertical motion of plurality of racks 20. Arm 120 is connected to a bracket 125 at the back of deep fryer 10. Arm 120 pivots in bracket 125. A short stroke linear actuator 135 provides lifting force to rack support 35 via linkage 130. Motor 85 provides motive force to short stroke linear actuator. Short stroke linear actuator 13 is operatively connected to motor and controller to lower and raise plurality of racks 20 relative to cooking oil. This embodiment also includes multiple counter balance gas springs 140 (one shown) to assist in the lifting of plurality of racks 20. Should short stroke linear actuator 135 fail, arm 120 serves as a safety measure to enable lifting of racks 21 from cooking oil.

Referring to FIG. 10, an alternative lift mechanism to the actuator 80, is hydraulic lift cylinder 110. Hydraulic lift cylinder 110 has a back-up gas spring 116 should hydraulic cylinder 110 fail to operate. In this embodiment, controller 42 sends signal to a pump in fluid communication with hydraulic lift cylinder 110. Release or removal of hydraulic fluid by pump 117 permits desired movement of hydraulic lift cylinder 110 and thus movement of plurality of racks into and from cooking oil. The embodiment of FIG. 10 can be used with either the straight track 70 of FIG. 4 or the v-shaped track of FIG. 6a, although a flat track 70 is shown. A flue riser 12 is disposed adjacent to and behind vat 30. FIG. 10 illustrates a further configuration of track 70 is shown. Track 70 operates together with at least eight rollers 81 that are external to the outer edges of track 70. This configuration provides additional alignment and security during lifting by hydraulic cylinder 110.

Figure 11:
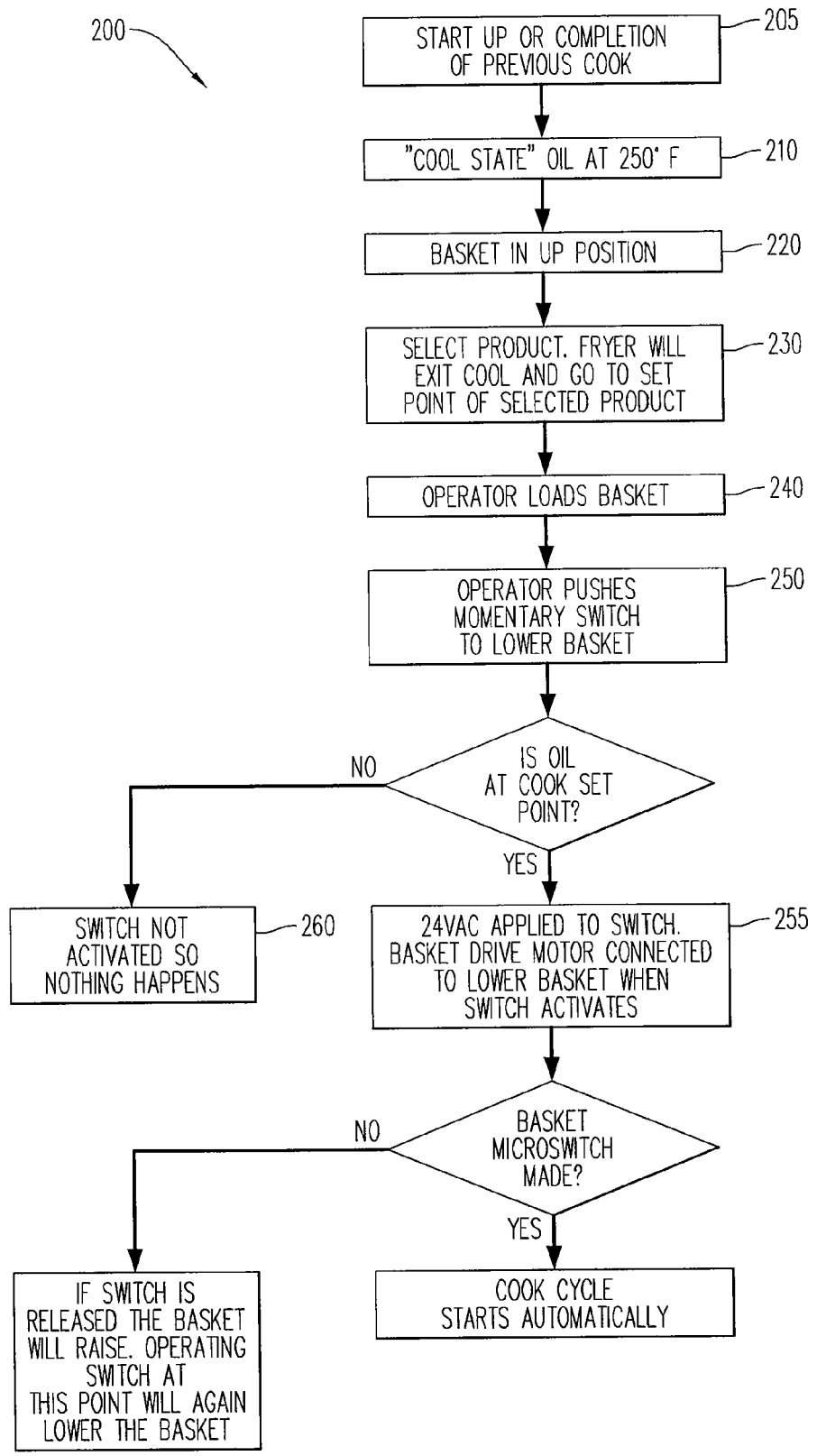
FIG. 11 illustrates an exemplary sequence of operation of lifting system according to the present disclosure.

Referring to FIG. 11, the operation of deep fryer 10 will be described in reference to chart 200. Prior to automated operation of lifting system 15, the cooking oil in vat 30 must be at a proper cooking temperature for the desired food product to be cooked. Alternatively, the previous cooking cycle must be completed at step 205. For example, if deep fryer 10 has been idle for a long period of time the temperature sensor will sense the "cool state" of the cooking oil at step 210. The plurality of racks 20 are in up position at step 220. At step 230, operator interfaces with control panel 45 to input the food product to be deep fried. Controller 42 retrieves cooking information from data storage device for the food product to be cooked such as the cooking time and the proper temperature range in which the food product is to be cooked. Controller 42 instructs heating elements to heat oil to the temperature associated with the desired food product. Controller 42 also receives signals from temperature sensor 65 indicative to cooking oil temperature in oil vat 30. Controller 42 only allows cooking cycle to commence when signal from temperature sensor indicates that cooking oil is within a preprogrammed range for the food product to be cooked. At step 240, operator can load food product into plurality of racks 20 with food product to be cooked.

At step 250, operator may optionally use pair of switches 55 disposed on opposite sides of control panel 45 to signal actuator 80 to lower plurality of racks 20 into oil vat 30. By having switches 55 disposed on opposite sides of control panel 45, operator is forced to use two hands to activate rack system and lower plurality of racks 20 at step 255. Alternatively, any other safety configuration of a single switch may also be used that would ensure operation of actuator 80 only once temperature sensor indicates that cooking oil is within preprogrammed range. However, if oil has not reached set point, at step 260, switches 55 or single switch, are not activated and plurality of racks are not lowered.

If cooking oil has achieved the set temperature, the switches 55 or switch is activated and motor 85 activates linear actuator 80 (or pump 117) which lowers plurality of racks 20 into cooking oil at step 255. If, either switch 55 is released prior to plurality of rack 20 being completely lowered, motor 85 will raise baskets. Plurality of racks 20 remain in a lowered position until cooking cycle is completed. Upon completion of cooking cycle, motor 85 or pump 117 receives signal and actuator 80 or hydraulic cylinder 110, respectively, automatically lift racks 20 from oil vat 30. By being completely automated based upon cooking temperatures and cooking cycle times, product quality is ensured and operator error and labor are minimized. When both linear actuator 80 and hydraulic cylinder 110 are used optional safety features such as air springs and counterbalance systems can be provided in the event of a power failure or should actuator or hydraulic cylinder fail.

Additionally, controller 42 permits additional quality control by permitting racks 20 to be briefly submerged in cooking oil when fryer 10 is operating at a setback temperature to prevent food product from sticking. To prevent sticking, pair of buttons 55 are pressed and rack 20 is submerged for approximately five seconds upon reaching the proper cooking depth. After approximately five seconds, rack 20 is raised from cooking oil. Other racks 20 may be submerged in the same fashion to prevent food thereon from sticking.

The sequence of operation may have an alternative sequence. For example, motor driven rack support 35 is functional for submerging racks for cooking or for dipping racks 20. Further, the lifting system of the present disclosure could be used with a pressure fryer system as well as standard depth fryers for cooking product that are not in multiple vertical racks.

Figure 12:
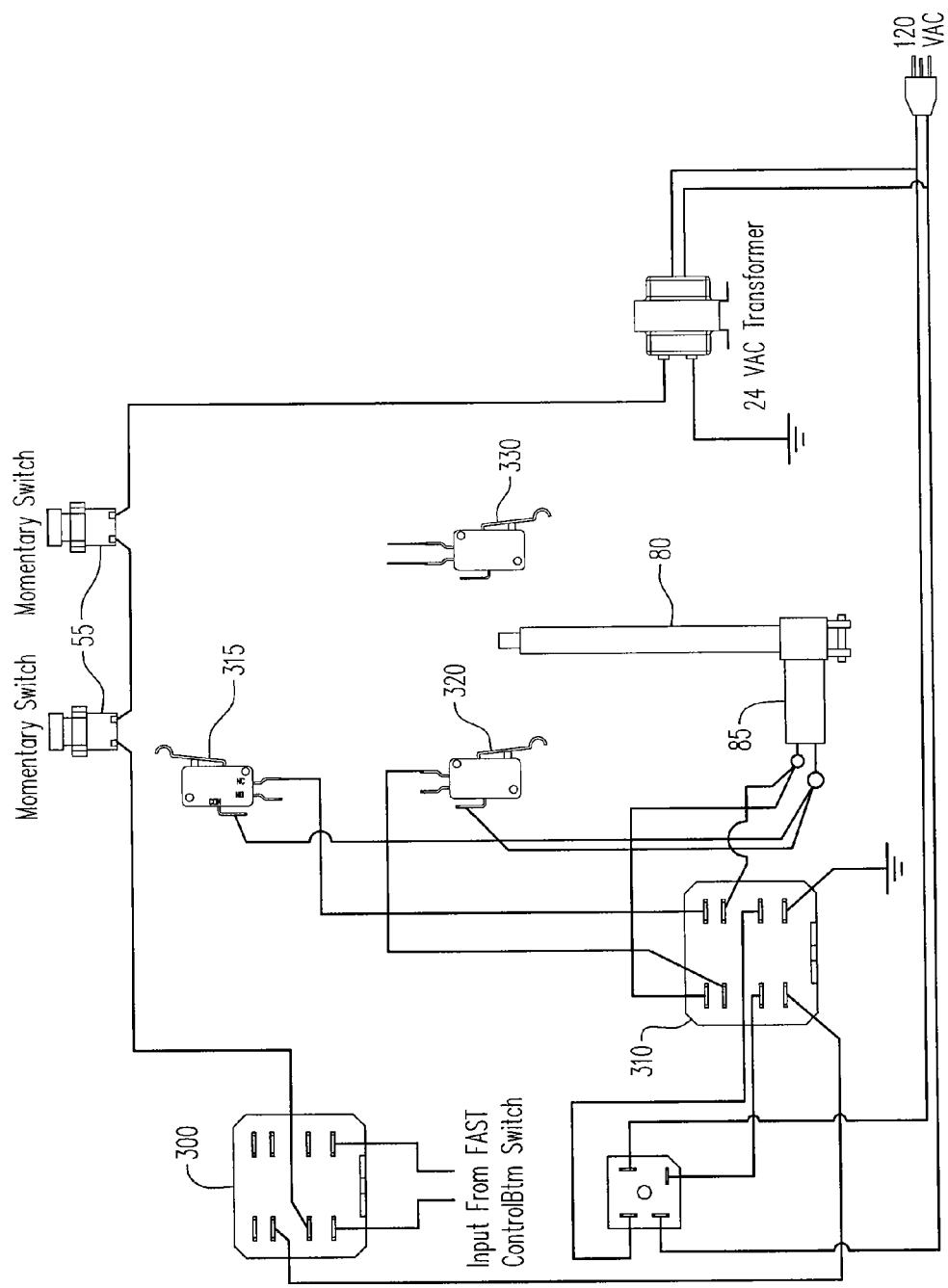
FIG. 12 illustrates a wiring diagram of the lifting system according to the present disclosure.

Referring to the wiring diagram of FIG. 12 and components of FIGS. 1 and 2, a cooking control relay 300 is operatively associated with controller 42 that controls overall operation of lifting system 15. Cooking control relay 300 communicates with controller 42 based inputs of operator from control panel 45. Lift control relay 310 feeds power from power source to actuator 80 via motor 85 to thereby extend or retract actuator 80. Alternatively, lift control relay 310 feeds power from power source to hydraulic cylinder 110 via pump 117 to thereby extend or retract hydraulic cylinder 110. Switches 315 and 320 stop motion of actuator 80 to return plurality of racks to raised position. Momentary switches 55 are disposed a distance apart on control panel 45 so that an operator must use two hands for proper operation of lifting system 15. If either or both of the switches 55 cease to be depressed, plurality of racks 20 will return to an elevated position. If a single switch is used, a single switch 55 such switch must be depressed for operation of lifting system 15. Once plurality of racks have reached lowest position, control switch 330 provides signal to controller 42 to start timing and cooking cycle for food product on racks 20.

In addition to the lifting system 15 being used with a deep fryer 10, as shown, lifting system 15 has broad applicability to pressure fryer systems as well as to standard depth fryers for cooking food product that are not in multiple vertical racks.

The present disclosure has been described with particular reference to the preferred embodiment. It should be understood that the foregoing descriptions and examples are only illustrative of the present disclosure. Various alternatives and modifications thereof can be devised by those skilled in the art without departing from the spirit and scope of the present disclosure. Accordingly, the present invention is intended to embrace all such alternatives, modifications, and variations that fall within the scope of the present disclosure.

We claim:

1. A racking system for a deep fryer, wherein the deep fryer contains cooking oil, the racking system comprising:
   an oil vat that contains cooking oil and that is disposed in a housing;
   at least one rack that carries a food product;
   an actuator operatively associated with said at least one rack to raise and lower said at least one rack within said oil vat;
   a sensor that detects a temperature of the cooking oil for said food product;
   a manual switch that is connected in an electrical circuit with said actuator;
   a controller that:
      upon receiving from said sensor a signal indicative that a detected pre-programmed temperature range of said cooking oil has been reached, enables said manual switch to operate said actuator to lower said at least one rack;
      upon receiving a signal that said rack has reached a desired cooking depth within said oil vat, controls a cooking cycle for said food product; and
      upon receiving a signal indicative that a pre-programmed length of time has passed during said cooking cycle, automatically enables said actuator to lift said rack out of said cooking oil.

2. The racking system according to claim 1, wherein said at least one rack is a plurality of racks that are connected to a rack support.

3. The racking system according to claim 2, further comprising a pair of tracks affixed to opposite sides of said housing, wherein said rack support is slidable along said pair of tracks to support said plurality of racks over and within said housing in a cantilevered fashion.

4. The racking system according to claim 2, wherein said actuator is one of a linear actuator or a hydraulic actuator.

5. The racking system according to claim 4, wherein said linear actuator is associated with a motor to provide a motive force to said linear actuator.

6. The racking system according to claim 4, wherein said controller sends a signal to said motor to activate said linear actuator to impart vertical movement to said rack support and said plurality of racks along said tracks.

7. The racking system according to claim 4, further comprising a pump, wherein said hydraulic actuator is in fluid communication with said pump to provide the motive force to said hydraulic actuator.

8. The racking system according to claim 4, wherein said controller sends a signal to said pump to supply or remove fluid from said hydraulic actuator to raise or lower said rack support and said plurality of racks over and within said housing along said tracks.

9. A racking system for a deep fryer, wherein the deep fryer contains cooking oil, the racking system comprising:
    an oil vat that contains cooking oil and that is disposed in a housing;
    a pair of tracks disposed on opposite sides of said housing for supporting at least one rack;
    an actuator operatively associated with said at least one rack;
    wherein said actuator raises and lowers said at least one rack within oil vat;
    a sensor disposed in said housing and submerged in cooking oil;
wherein said sensor detects a temperature of the cooking oil;
    a manual switch that is connected in an electrical circuit with said actuator; and
    a controller that stores information related to a cooking cycle for a plurality of different food products and, upon receiving form said sensor a signal indicative that a detected pre-programmed temperature range of said cooking oil has been reached, enables said manual switch to operate actuator to lower said at least one rack; upon receiving a signal that said rack has reached desired cooking depth within said oil vat, controls a selected cooking cycle for a selected one of said food products, and, upon receiving a signal indicative that a pre-programmed length of time has passed during said cooking cycle, automatically enables said actuator to lift said rack out of said cooking oil.

10. The racking system according to claim 9, further comprising a rack support that is slidably connected to said pair of tracks; wherein said rack supports a plurality of racks that contain food product; and at least a pair of bearings disposed in each of said pair of tracks to permit sliding movement of said rack support along said pair of tracks.

11. The racking system according to claim 9, wherein said actuator is one of a linear actuator or a hydraulic actuator.

12. The racking system according to claim 11, wherein said controller sends a signal to said motor to activate said linear actuator to impart vertical movement to said at least one rack.

13. The racking system according to claim 11, wherein aid controller sends a signal to said pump that is in fluid communication with said hydraulic actuator to supply or remove fluid from said hydraulic actuator to raise or lower said at least one rack.

14. The racking system according to claim 10 further comprising: an arm, a sliding bracket that is affixed to said rack support, a fixed bracket affixed to said tracks; an actuator, wherein said sliding bracket slides in said tracks, and wherein movement of said actuator causes said arm to pivot in said fixed bracket and permits movement of said arm in said sliding bracket, thereby permitting said rack support to move in a vertical direction along said tracks.

15. The racking system according to claim 10 further comprising a safety system associated with said plurality of racks to lift said plurality of racks.

16. The racking system according to claim 15, wherein said safety system is one of a counterbalance springs or counter balance gas springs.

17. A racking system for a deep fryer, wherein the deep fryer contains cooking oil, the racking system comprising:
    an oil vat that contains cooking oil and that is disposed in a housing;
    a pair of tracks disposed on opposite sides of said housing for supporting at least one rack;
    an actuator operatively associated with said at least one rack; wherein said actuator raises and lowers said at least one rack within said oil vat;
    a sensor disposed in said housing and submerged in cooking oil;
wherein said sensor detects a temperature of the cooking oil;
    a manual switch that is connected in an electrical circuit with said actuator;
    a rack support that is slidably connected to said pair of tracks; wherein said rack supports a plurality of racks that contain food product; and at least a pair of bearings disposed in each of said pair of tracks to permit sliding movement of said rack support along said pair of tracks, wherein each of said pair of tracks are v-shaped tracks and said at least one pair of bearings are round planetary bearings; and
    a controller that stores information related to a cooking cycle for a plurality of different food products and, upon receiving from said sensor a signal indicative that a detected pre-programmed temperature range of said cooking of has been reached, enables said manual switch to operate said actuator to lower said at least one rack, upon receiving a signal that said rack has reached a desired cooking depth within said oil vat, controls said cooking cycle for a selected one of said food products, and, upon receiving a signal indicative that a pre-programmed length of time has passed during said cooking cycle, automatically enables said actuator to lift said rack out of said cooking oil.

18. A racking system for a deep fryer, wherein the deep fryer contains cooking oil, the racking system comprising:
    an oil vat that contains cooking oil and that is disposed in a housing;
    a pair of tracks disposed on opposite sides of said housing for supporting at least one rack;
    an actuator operatively associated with said at least one rack; wherein said actuator raises and lowers said at least one rack within oil vat;
    a sensor disposed in said housing and submerged in the cooking oil;
    wherein said sensor detects a temperature of the cooking oil;

a manual switch that is connected in an electrical circuit with said actuator;

a rack support that is slidably connected to said pair of tracks; wherein said rack supports a plurality of racks that contain food product; and at least a pair of bearings disposed in each of said pair of tracks to permit sliding movement of said rack support along said pair of tracks, wherein each of said pair of tracks are flat tracks and said at least one pair of bearings are cupped bearings; and a controller that stores information related to a cooking cycle for a plurality of different food products and, upon receiving from said sensor a signal indicative that a detected pre-programmed temperature range of said cooking oil has been reached, enables said manual switch to operate said actuator to lower said at least one rack, upon receiving a signal that said rack has reached a desired cooking depth within said oil vat, controls a cooking cycle for said food product, upon receiving a signal indicative that a pre-programmed length of time has passed during said cooking cycle, automatically enables actuator to lift said rack out of said cooking oil.

\* \* \* \* \*